(12) United States Patent
Wittenberg et al.

(10) Patent No.: US 10,970,503 B2
(45) Date of Patent: Apr. 6, 2021

(54) IMAGING ARRANGEMENTS AND BARCODE READERS INCLUDING SUCH IMAGING ARRANGEMENTS

(71) Applicant: Zebra Technologies Corporation, Lincolnshire, IL (US)

(72) Inventors: Carl D. Wittenberg, Water Mill, NY (US); Igor Vinogradov, Oakdale, NY (US); Vladimir Gurevich, Great Neck, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/170,663

(22) Filed: Oct. 25, 2018

(65) Prior Publication Data
US 2020/0134273 A1 Apr. 30, 2020

(51) Int. Cl.
*G06K 7/10* (2006.01)
*H04N 5/225* (2006.01)
*G06K 7/14* (2006.01)
*G02B 27/30* (2006.01)

(52) U.S. Cl.
CPC ......... *G06K 7/10732* (2013.01); *G02B 27/30* (2013.01); *G06K 7/1413* (2013.01); *H04N 5/2252* (2013.01)

(58) Field of Classification Search
CPC ............. G06K 7/10732; G06K 7/1413; G06K 7/10881; G06K 7/10831; G02B 27/30; G02B 19/0028; G02B 19/0085; H04N 5/2252
See application file for complete search history.

(56) References Cited

U.S. PATENT DOCUMENTS

| | | | |
|---|---|---|---|
| 2010/0213258 A1* | 8/2010 | Liu | G06K 7/10732 235/462.41 |
| 2011/0270585 A1* | 11/2011 | Chen | G02B 3/02 703/1 |
| 2013/0330230 A1* | 12/2013 | Uri | G01N 21/553 422/69 |
| 2016/0026838 A1* | 1/2016 | Gillet | G06K 7/10831 235/462.21 |
| 2017/0262676 A1* | 9/2017 | Gifford | G06K 7/10841 |
| 2017/0351110 A1* | 12/2017 | Gurgov | G02B 27/0944 |
| 2018/0143139 A1* | 5/2018 | Simske | G01N 21/03 |

* cited by examiner

*Primary Examiner* — Sonji N Johnson
(74) *Attorney, Agent, or Firm* — Yuri Astvatsaturov

(57) ABSTRACT

Imaging arrangements and barcode readers including such imaging arrangements. An imaging arrangement for use in a barcode reader includes a housing. The imaging arrangement also includes a light source configured to emit light along a central light axis. The light source is disposed in the housing. The imaging arrangement also includes a lens having a first surface and a second surface opposite the first surface. The lens is disposed in the housing. The first surface is configured to face the light source and is structured to substantially collimate light received from the light source into a collimated beam. The second surface includes surface structures structured to generate a patterned beam in response to receiving the collimated beam.

23 Claims, 7 Drawing Sheets

IMAGING ARRANGEMENTS AND BARCODE READERS INCLUDING SUCH IMAGING ARRANGEMENTS

FIELD OF THE DISCLOSURE

The present patent relates generally to imaging arrangements and, in particular, relates to imaging arrangements and barcode readers including such imaging arrangements.

BACKGROUND

Imaging arrangements included in handheld barcode readers can be used to read barcodes. Because these handheld barcodes are handheld and, thus, not overly large, the available real-estate for additional options is limited.

Accordingly, there is a need for further advances in imaging arrangements and barcode readers including such imaging arrangements.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1A:
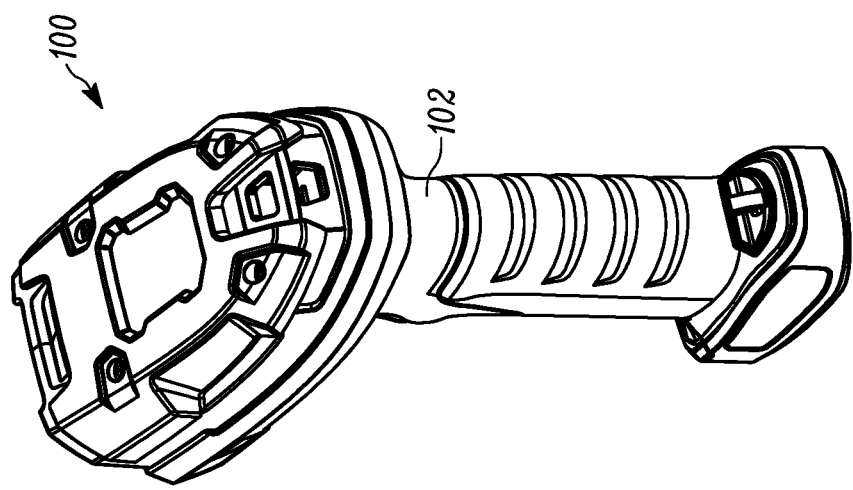
FIG. 1A illustrates a perspective view of an example barcode reader in accordance with the teachings of this disclosure.
Figure 1A:
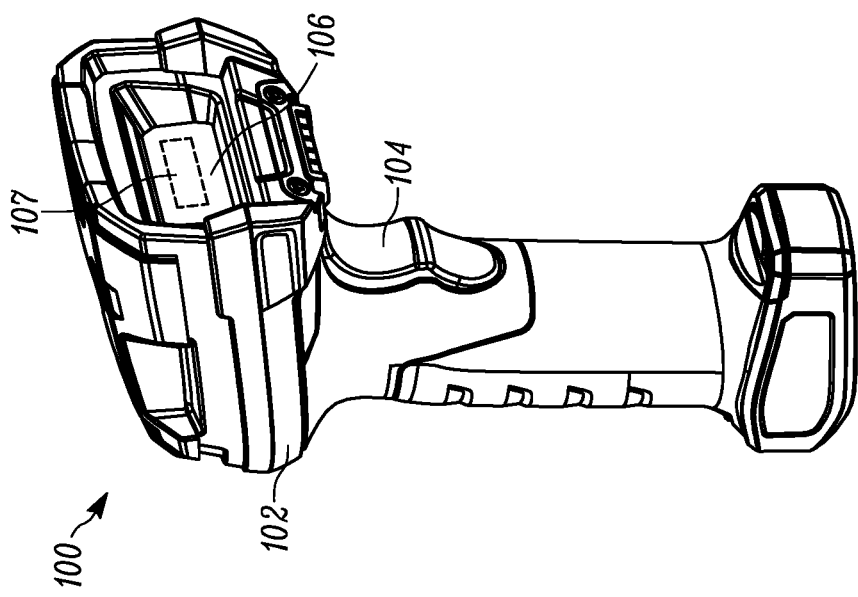

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to imaging arrangements and scanning arrangements that have a width that satisfies a threshold. In some examples, the threshold is approximately 9 millimeters (mm) or less. As set forth herein, the phrase "approximately 9 millimeters" means+/−2 mm of 9 mm and/or accounts for manufacturing tolerances. In some examples, the width is defined between a printed circuit board (PCB) at a rear wall of the arrangement and a front of the arrangement. The imaging arrangements may be referred to as imaging engines that can be used with barcode readers and the scanning arrangements may be referred to as scanning engines that can be used with barcode scanners.

To enable the width of the arrangements to satisfy the threshold and in contrast to known examples that include discrete collimating lenses and pattern generators, the disclosed arrangements include a single integral part that includes both an example collimating lens and an example pattern generator. The part may be a plastic-molded part. The pattern generator may be referred to a laser pattern generator, a light-emitting diode pattern generator, an illuminating pattern generator or an aiming pattern generator and the part may be referred to as a lens or a collimating-pattern-generating lens, where it will be understood that references to a "lens" include references to multiple lens configured to collectively provide similar operation.

In some embodiments, the part includes a first surface forming the collimating lens and a second surface forming the pattern generator. The first surface is structured to face the light source and the second surface is structured to face away from the light source. The light source may be implemented by a laser or a light-emitting diode (LED). To collimate light entering the part, in some examples, the first surface is structured as an aspheric surface, a substantially hyperbolic surface, a beam forming surface or has another contour structured to collimate light. For example, the first surface can be implemented as a refractive surface, a Fresnel surface or a diffractive surface. As set forth herein, the phrase "substantially hyperbolic" means that the surface would not deviate from the hyperbolic surface more than 20 waves root means squared (rms). To enable light exiting the imaging arrangement and/or the associated barcode reader to have a particular pattern, the disclosed second surface includes surface structures, a pattern forming surface and/or is otherwise structured to generate a pattern. For example, the second surface can be implemented as a diffractive optical element (DOE), a refractive optical element (ROE), an engineered diffuser (ED) and the pattern generated may be in the form of cross-hairs, a plus sign, etc.

To limit an extent of light entering the example lens and/or to prevent light scattering, an aperture is positioned between the light source and the first surface facing the light source. Put another way, the aperture enables a first portion of the light emitted from the light source to pass through the lens and prevents a second portion of the light emitted from the light source from passing through the lens. While the aperture may have any size, in some examples, the size of the aperture is approximately 1 millimeters (mm) approximately 2.3 mm or greater (e.g., 3 mm) or is approximately 2.7 mm. More generally, the aperture is between about 1 mm and 5 mm. As set forth herein, the phrases "approximately 2.5 mm" and "approximately 2.7 mm" means+/−0.5 mm of 2.3 mm and 2.7 mm, respectively, and/or accounts for manufacturing tolerances. While the aperture is disclosed being positioned between the first surface and the light source, the aperture can alternatively be disposed adjacent the second surface such that the light is "clipped" and the second portion of the light is removed after the light emitted from the light source passes through the lens.

To substantially prevent reflective light from being re-emitted by the imaging arrangement, in some examples, the second surface including the pattern-generating structures is angled relative to a transverse plane that extends between opposing sides of the imaging arrangement. For example, the second surface can be angled relative to the transverse plane by approximately 3°. If the second surface were not angled in a manner to prevent light reflected through the second surface from being re-emitted by the arrangement, the light emitted by the arrangement may not result in the intended pattern. In other words, if the reflective light were re-emitted by the arrangement, a second pattern distinct from the intended pattern may be emitted by the arrangement. Furthermore, in some examples, the angle of the second surface enables the pattern emitted by the imaging arrangement toward a camera of the imaging arrangement to correct for parallax between the light source and the camera. The camera may be referred to as an image acquisition assembly, an imaging assembly or an imager assembly. While the second surface may be disposed at any angle relative to a transverse plane of the arrangement, in some examples, the second surface can be angled at approximately 3° relative to the transverse plane.

In a first example, an imaging arrangement for use in a barcode reader includes a housing. The imaging arrangement also includes a light source configured to emit light along a central light axis. The light source is disposed in the housing. The imaging arrangement also includes a lens having a first surface and a second surface opposite the first surface. The lens is disposed in the housing. The first surface is configured to face the light source and is structured to substantially collimate light received from the light source into a collimated beam. The second surface includes surface structures structured to generate a patterned beam in response to receiving the collimated beam. In a variation of the first example, the second surface is angled relative to the light source such that light reflected from the second surface toward the light source is directed at an oblique angle relative to the central light axis.

In a second example, an imaging arrangement for use in a barcode reader includes a housing including a front wall and a rear wall. The imaging arrangement also includes a light source configured to emit light. The light source is to be disposed in the housing proximate the rear wall. The imaging arrangement also includes means for collimating the light from the light source into a collimated beam and generating a patterned beam in response to receiving the collimated beam. The means for the collimating of the light and the generating of the patterned beam enables a distance between the front wall and the rear wall to be approximately 9 millimeters or less. The means for the collimating of the light and the generating of the patterned beam is positioned proximate the front wall. In an example, the means for the collimating of the light and the generating of the patterned beam includes a lens including a first surface and a second surface opposite the first surface. The lens is to be disposed in the housing. The first surface is configured to face the light source and is structured to substantially collimate light received from the light source into the collimated beam. The second surface includes surface structures structured to generate the patterned beam in response to receiving the collimated beam.

In a third example, a barcode reader includes a housing and an imaging arrangement disposed in the housing. The imaging arrangement includes a light source configured to emit light and a lens having a first surface and a second surface opposite the first surface. The first surface is configured to face the light source and is structured to substantially collimate light received from the light source into a collimated beam. The second surface includes surface structures structured to generate a patterned beam in response to receiving collimated beam. In a variation of the third example, the barcode reader includes an aperture disposed between the light source and the lens. The aperture is sized to enable a first portion of the light emitted from the light source to pass through the lens and to prevent a second portion of the light emitted from the light source from passing through the lens.

Referring to FIG. 1A, shown therein is an example barcode reader 100 having a housing 102 with a cavity for housing internal components, a trigger 104 and a housing window 106. In this example, an example imaging arrangement 107 is positioned within the cavity of the housing 102 and is configured to capture image data through the housing window 106 and, specifically, to read barcodes over a relatively far working distance range. The imaging arrangement 107 may be referred to as an imaging engine that includes elements such as, for example, an aiming light assembly or an illumination light assembly. In other instances, the imaging engine can include image capture components like an image sensor(s).

The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 1B:
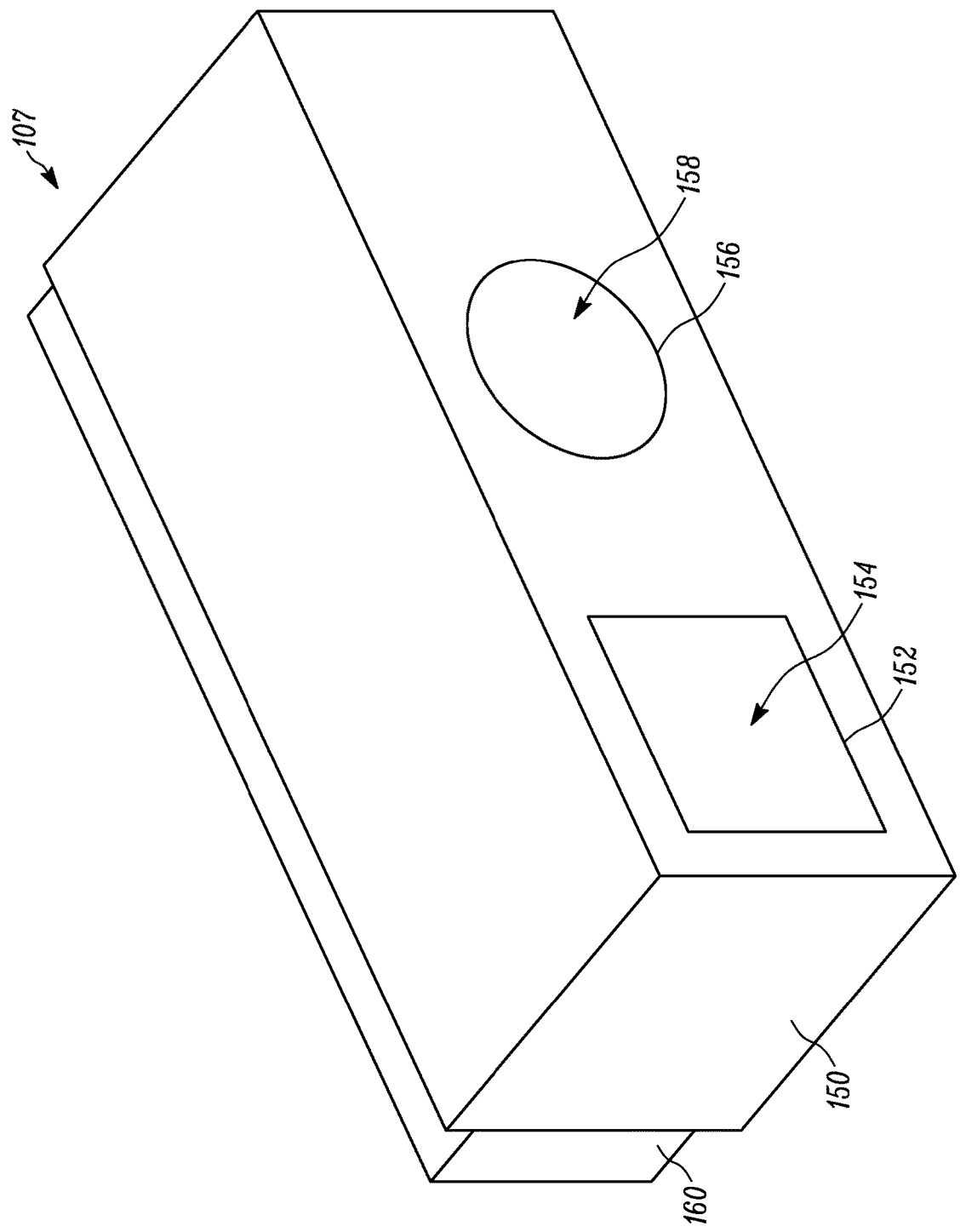
FIG. 1B illustrates an isometric view of an example imaging arrangement that can be used to implement the barcode reader of FIG. 1A.

FIG. 1B illustrates an isometric view of the imaging arrangement 107 that can be used to implement the barcode reader 100 of FIG. 1A. In the illustrated example, the imaging arrangement 107 includes a housing 150 defining a first aperture 152 that enables access to an example lens 154 and a second aperture 156 that enables access to an imaging assembly 158. The imaging assembly 158 includes an imaging sensor having a plurality of photosensitive elements that define a substantially flat surface along with other components such as a housing and lens(es) for capturing image data for a field of view. The image data may include barcode data and the imaging assembly 158 may be referred to as a camera or an imager assembly. Moreover, one or more illumination assemblies can be positioned within the imaging arrangement 107. To accommodate any of the one or more additional illumination assemblies to, for example, image light, one or more additional apertures can be defined by the housing 150. As also shown, the housing 150 carries a printed circuit board (PCB) 160 that can be used to process image data accessed by the imaging assembly 158, for example.

Figure 2:
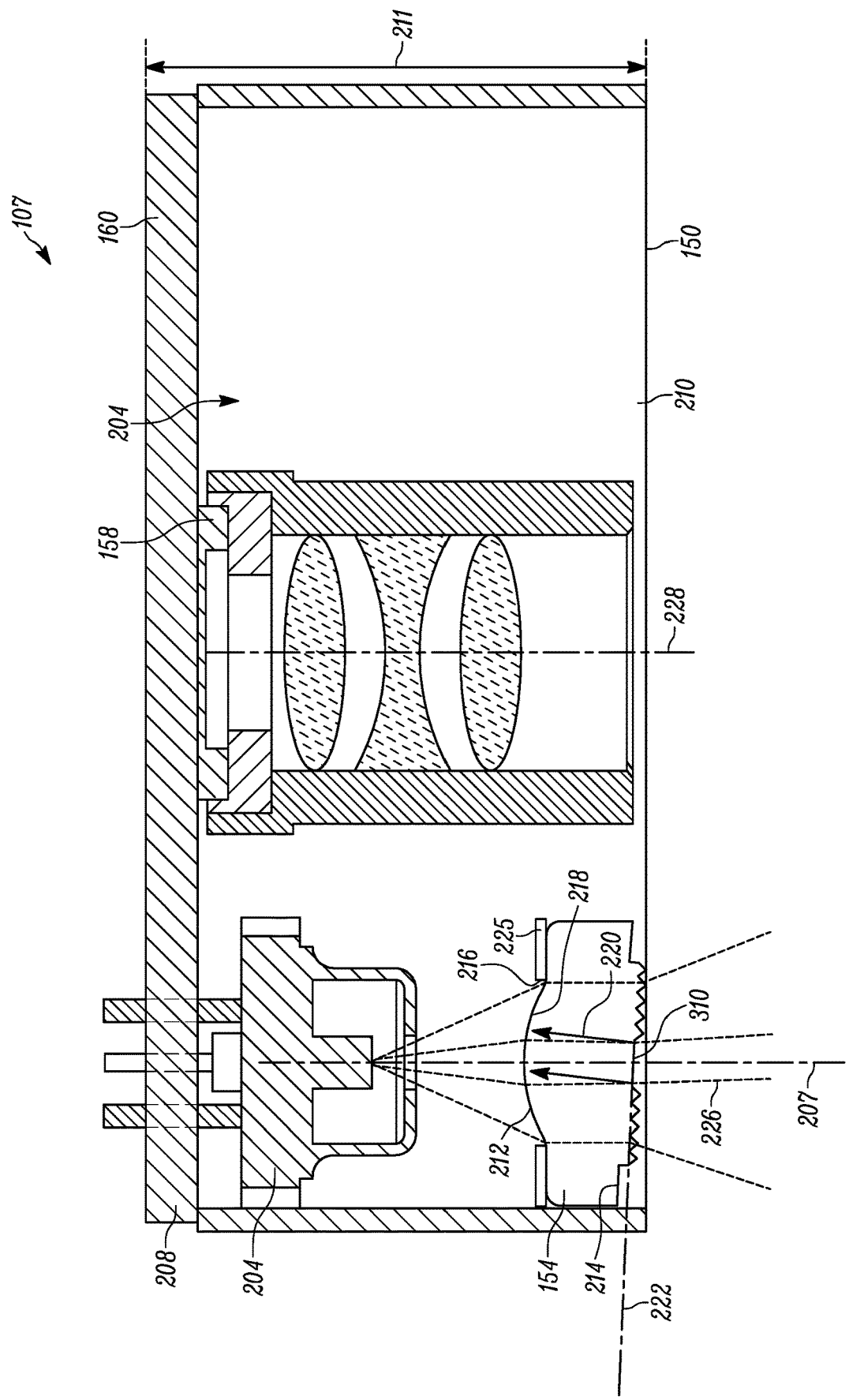
FIG. 2 illustrates a cross-sectional plan view of an example imaging arrangement that can be used to implement the imaging arrangement of FIG. 1B.

FIG. 2 illustrates a cross-sectional plan view of the imaging arrangement 107 that can be used to implement the barcode reader 100 of FIG. 1B. In the illustrated example, a light source 204 and the lens 154 are disposed in the housing 150. The light source 204 and the lens 154 may be referred to as an aiming assembly, the light source 204 may be referred to as an aiming light source and the lens 154 may be referred to as an aiming lens assembly or an aiming beam shaper. The light source 204 is configured to emit light along a central light axis 207. The light source 204 may be implemented by a laser and the light emitted by the light source 204 may be referred to as an aiming light.

In the illustrated example, the light source 204 is positioned proximate a rear wall 208 of the housing 150 formed by the PCB 160 and the lens 154 is positioned proximate a front wall 210 of the housing 150. To couple the lens 154 within the housing 150, the lens 154 may be received within a slot defined by the housing 150. However, the lens 154 may be retained and/or carried by the housing 150 in any other suitable way including, for example, adhesive, fasteners, press fit, securing clips, latches, etc.

The lens 154 is shown being formed of a single-molded part having a "wedge shape" that is structured to both collimate light received from the light source 204 and to generate a patterned beam (e.g., a patterned aiming beam) in response to receiving the collimated beam. By structuring the lens 154 to both collimate light received from the light source 204 and to generate a patterned beam in response to receiving the collimated beam, a width 211 of the imaging arrangement 107 between the front wall 210 and the rear wall 208 is able to satisfy a threshold. In some examples, the threshold is about 10 millimeters or less. As set forth herein, the phrase "about 10 millimeters" means+/−1.5 mm of 10 mm. Moreover, by structuring the lens 154 in accordance with the teachings of this disclosure, a focal length of the lens 154 can be greater than or approximately equal to 1.0 mm, 2.8 mm, 3 mm, 3.5 mm or less than 5 mm. As set forth herein, the phrase "approximately 1.0 millimeters," "approximately 2.8 millimeters" "approximately 3.0 mm" and "approximately 3.5 mm" means+/−0.5 millimeters of 2.8 mm and 3 mm, respectively, and/or accounts for manufacturing tolerances. However, the focal length of the lens 154 can be any suitable focal length between about 0.25 mm-5 mm. The cross-section of the light when the desired effective focal length is achieved may be elliptical or circular. However, the cross-section of the light may be different depending on the application, for example.

The lens 154 shown in FIG. 2 includes a first surface 212 and a second surface 214 opposite the first surface 212. The first surface 212 faces the light source 204 and is structured to substantially collimate light received from the light source 204. To collimate the light received from the light source 204, the first surface 212 can be implemented by an aspheric surface, a convex surface, a hyperbolic surface, a refractive surface, a Fresnel surface or a diffractive surface.

To prevent some of the light emitted from the light source 204 from passing through the lens 154, an example aperture 216 is positioned adjacent to a portion of the first surface 212 and between the lens 154 and the light source 204. In other words, the aperture 216 is sized and/or structured to enable a first portion of the light emitted from the light source 204 to pass through the lens 154 and to prevent a second portion of the light emitted from the light source 204 from passing through the lens 154. The aperture 216 is shown being defined by an element (e.g., a layer) and being positioned to enable a portion 218 of the first surface 212 to extend through the aperture 216 toward the light source 204. In some examples, the aperture 216 is greater than or approximately equal to 2.3 mm. However, the aperture 216 can be sized to enable more or less light from the light source 204 to pass through the lens 154.

The second surface 214 faces away from the light source 204 and is structured to generate the patterned beam. To generate the patterned beam, the second surface 214 can be implemented by a diffractive optical element, a refractive optical element, or an engineered diffuser. In some instances when light emitted by the light source 204 impinges on the second surface 214, this light may be reflected back toward the first surface 212 and into a cavity 219 occupied by the light source 204. Thereafter, this reflected light may pass through the lens 154 in an undesired manner. Such an occurrence may be addressed by angling the second surface 214 as shown in the disclosed example of FIG. 2. Specifically, to address such an occurrence, the second surface 214 is angled such that light reflected from the second surface 214 toward the light source 204 is reflected at an oblique angle relative to the central light axis 207. Put another way, a plane 222 that extends along the second surface 214 is angled relative to the light source 204 such that light reflected from the second surface 214 travels toward the light source 204 in a direction generally indicated by arrows 220. In the illustrated example, the second surface 214 is angled at approximately 3° relative to a planar portion 225 of the first surface 212. As set forth herein, the phrase "approximately 3°" means+/−1.2° of 3° and/or accounts for manufacturing tolerances. However, the second surface 214 and the planar portion 225 can be disposed at other angles relative to one another (e.g., 1°, 2°, 5°, etc.).

To enable the imaging arrangement 107 to capture image data associated with the patterned beam, the imaging arrangement 107 includes the imaging assembly 158 disposed in the housing 150. To correct parallax of the imaging assembly 158, the second surface 214 is shown deflecting an aiming pattern 226 by approximately 2° toward a central axis 228 of the imaging assembly 158. As set forth herein, the phrase "approximately 2°" means+/−1° of 2° and/or accounts for manufacturing tolerances. For example, the aiming pattern 226 can be deflected by 2.7°.

Figure 3:
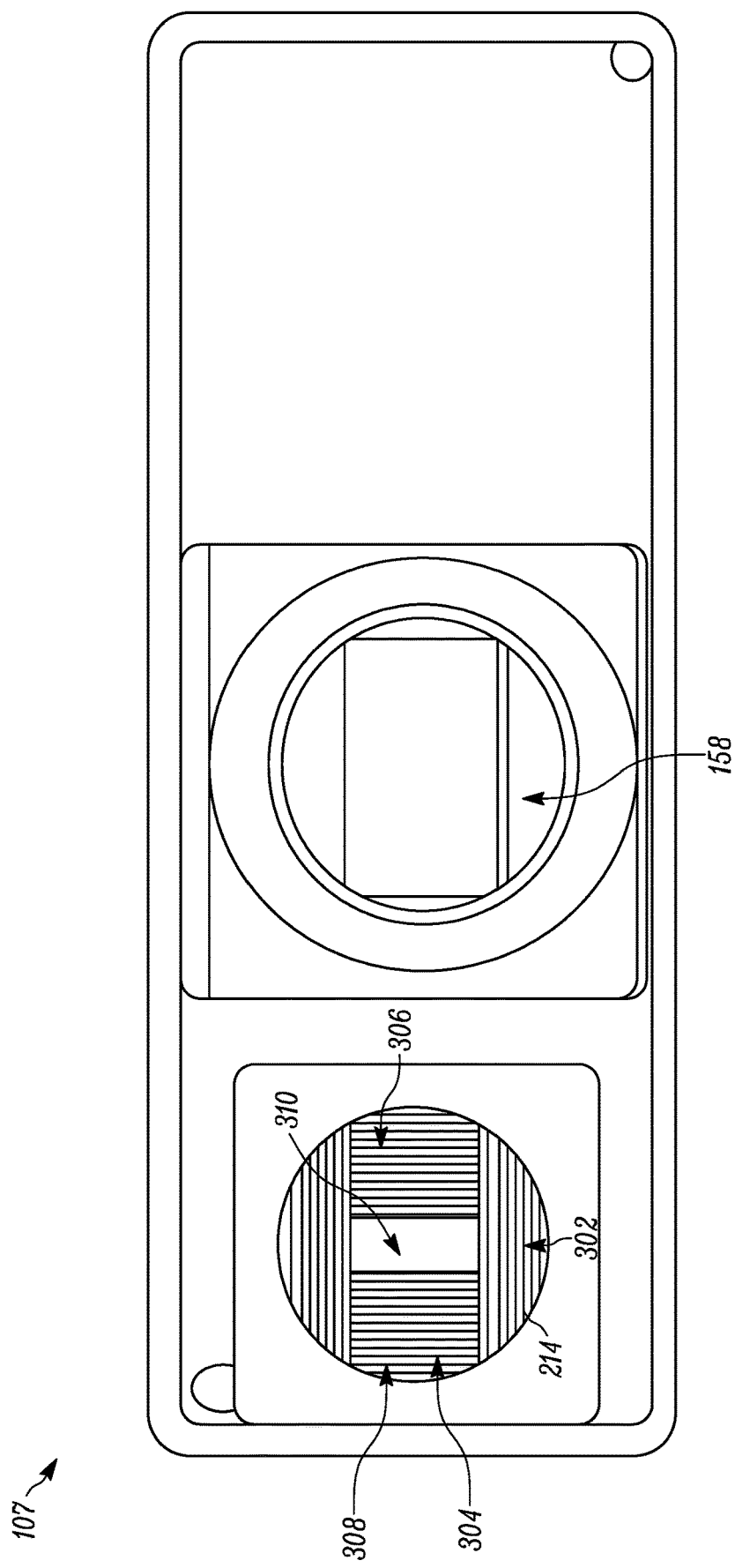
FIG. 3 is a front view of the imaging arrangement of FIG. 2.

FIG. 3 illustrates a front view of the imaging arrangement 107 illustrating the second surface 214 of the lens 154 and the imaging assembly 158. As shown, the second surface 214 includes first ribs 302 and second ribs 304, where the first ribs 302 are positioned substantially perpendicularly relative to the second ribs 304. The first ribs 302 are shown being substantially parallel to one another and the second ribs 304 are shown being substantially parallel to one another. As set forth herein, the phrase "substantially perpendicular" when used in connection with the ribs 302, 304 means+/−2.5° of perpendicular and/or accounts for manufacturing tolerances and the phrase "substantially parallel" when used in connection with the ribs 302, 304 means+/−2.5° of perpendicular and/or accounts for manufacturing tolerances. The ribs 302, 304 may be referred to as surface structures and may be implemented by cylindrical lenses, lenticular lenses, lens arrays, prismatic lenses, lenslet arrays, etc. In other words, the ribs 302, 304 can be formed of optical elements configured to modify the direction of light. As also shown, the second surface 214 includes first and second portions 306, 308 formed by the ribs 304 and a central portion 310 positioned between the first and second portions 306, 308. Put another way, the first and second portions 306, 308 flank the central portion 310. Referring back to FIG. 2, the plane 222 is shown extending along the central portion 310, which is substantially parallel to the central portion 310 that is shown as being substantially flat. As set forth herein, the phrase "substantially parallel" means+/−5° of parallel and/or accounts for manufacturing tolerances. Additionally or alternatively, the plane 222 can be defined by vertices of the ribs 302, 304.

Figure 4:
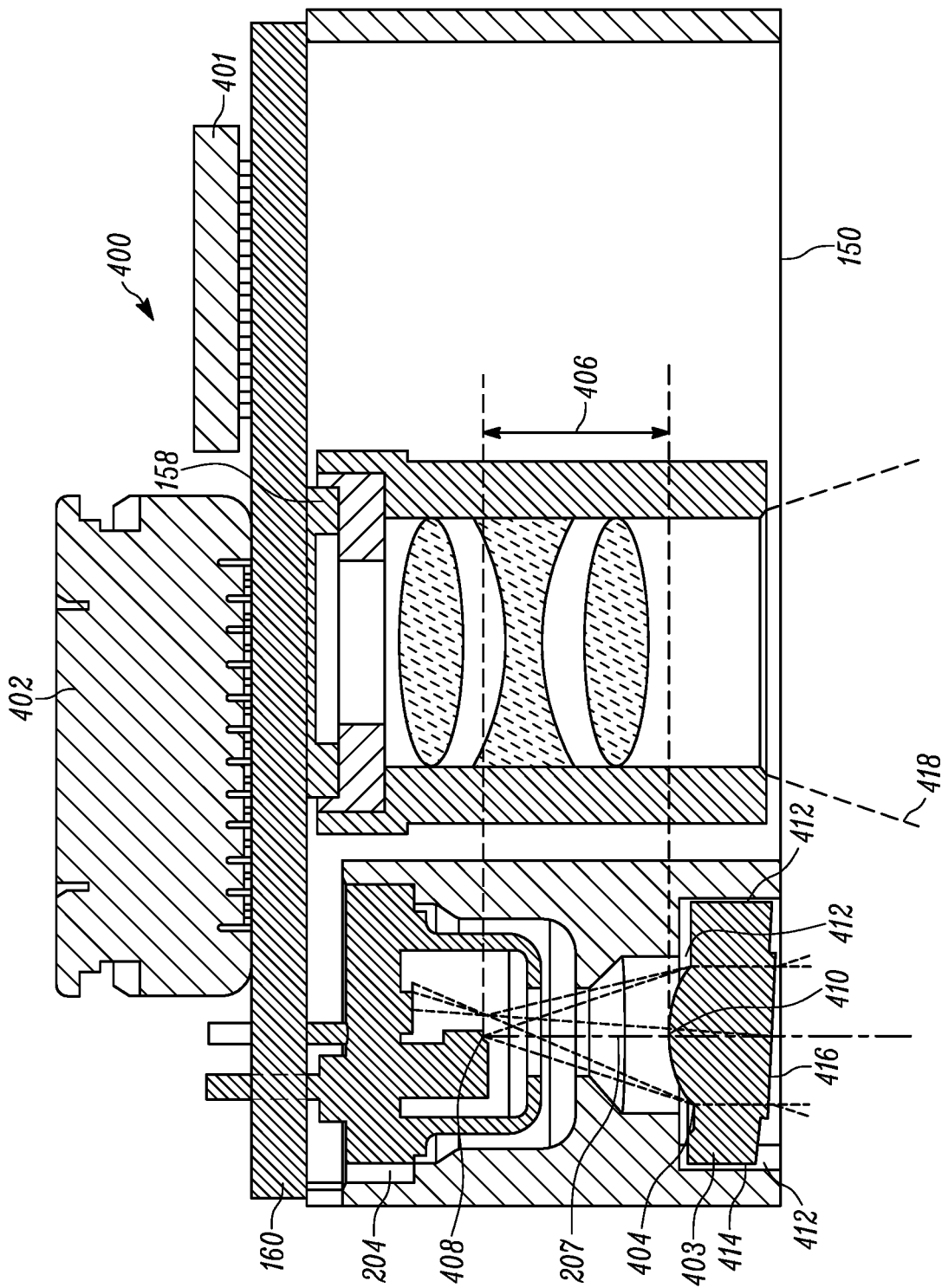
FIG. 4 illustrates a cross-sectional plan view of another example imaging arrangement that can be used to implement the imaging arrangement of FIG. 1B.

FIG. 4 illustrates a cross-sectional plan view of another example imaging arrangement 400 that can be used to implement the barcode reader 100 of FIG. 1B. The imaging arrangement 400 is similar to the imaging arrangement 200 of FIG. 2 but includes a controller 401, an input/output (IO) connector 402 and an example lens 403. The lens 403 includes a first surface 404 that is implemented by a refractive surface that compensates for spherical aberrations using a hyperbolic surface profile represented by Equation 1. The controller 401 can be used to control the light source 204 and the imaging assembly 158 and the IO connector 402 can be used to enable the imaging assembly 158, for example, to communicate with additional electronic components. Referring to Equation 1, z represents the surface sag (negative), r represents a radial coordinate, c represents the surface curvature (1/R), and k represents the conic constant. As shown below, the surface radius of curvature, R, is defined by Equation 2, the surface curvature, c, is defined by Equation 3, the conic constant, k, is defined by Equation 4 and the refractive index is represented by n.

$$z = \frac{cr^2}{1 + \sqrt{1 - (1+k)c^2r^2}} \quad \text{Equation 1}$$

$$R = \frac{-f}{(n-1)} \quad \text{Equation 2}$$

$$c = \frac{1}{R} \quad \text{Equation 3}$$

$$k = -n^2 \quad \text{Equation 4}$$

When the first surface 404 is implemented using Equation 1, the hyperbolic surface profile does not satisfy the sinus condition, r=f sin α, required for compensation of coma. As a result, the first surface 404 may be sensitive to the shift of the light source 204 from the central light axis 207. To deter the lens 403 and/or the light source 204 from moving, in the illustrated example, mechanical centration alignment can be used.

As with the lens 206 of FIG. 2, the lens 403 of FIG. 4 is carried by the housing 150. In the illustrated example, the housing 150 includes walls 412 that define a slot 414 that is structured to receive the lens 403. As shown, the first surface 404 has a radius of curvature of approximately 1.86277 mm, and is used on a part with a refractive index n=1.5322. As also shown, a distance 406 between an emission point 408 of the light source 204 and a vertex 410 of the first surface 404 is approximately 3.5 mm. However, the distance 406 may be different than approximately 3.5 mm. As set forth herein, the phrase "approximately 3.5 mm" means+/−0.5 mm of 3.5 mm and/or accounts for manufacturing tolerances.

The lens 403 includes a second surface 416 that is structured to generate a patterned beam in response to receiving the collimated beam formed by the first surface 404. In some examples, the second surface 416 is implemented by transparent grading and/or micro-lenses such as, for example, a cylindrical set of micro-lenses. To enable image data to be captured by the imaging assembly 158, the imaging assembly 158 has a field of view 418 of approximately 48°. However, the imaging assembly 158 can be configured to have any other desired field of view.

Figure 5:
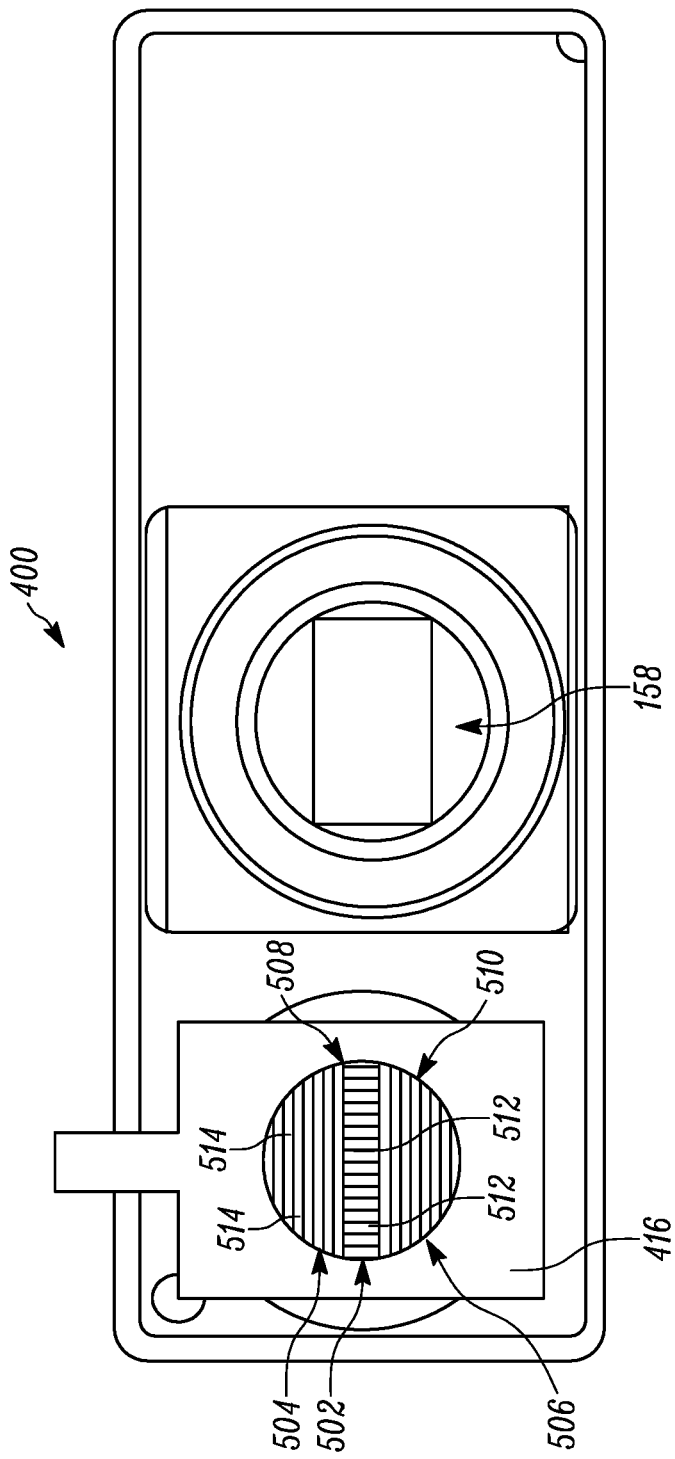
FIG. 5 is a front view of the imaging arrangement of FIG. 4.

FIG. 5 illustrates a front view of the imaging arrangement 400 illustrating the second surface 416 of the lens 403 and the imaging assembly 158. As shown, the second surface 416 includes an example horizontal line generator 502, example vertical line generators 504, 506 and example windows 508, 510. It should be appreciated that the horizontal line generator 502 includes a plurality of vertical ribs 512 which vertically align light along a horizontal section creating horizontally illuminated portions. Similarly, it should be appreciated that the vertical line generator 504 includes a plurality horizontal ribs 514 which horizontally align light along a vertical section creating vertically illuminated portions. The ribs 512, 514 can be implemented by cylindrical lenses, lenticular lenses, lens arrays, prismatic lenses, lenslet arrays, etc. The windows 508, 510 allow light to pass therethrough without directional modification to enable central indicators to be formed.

Figure 6:
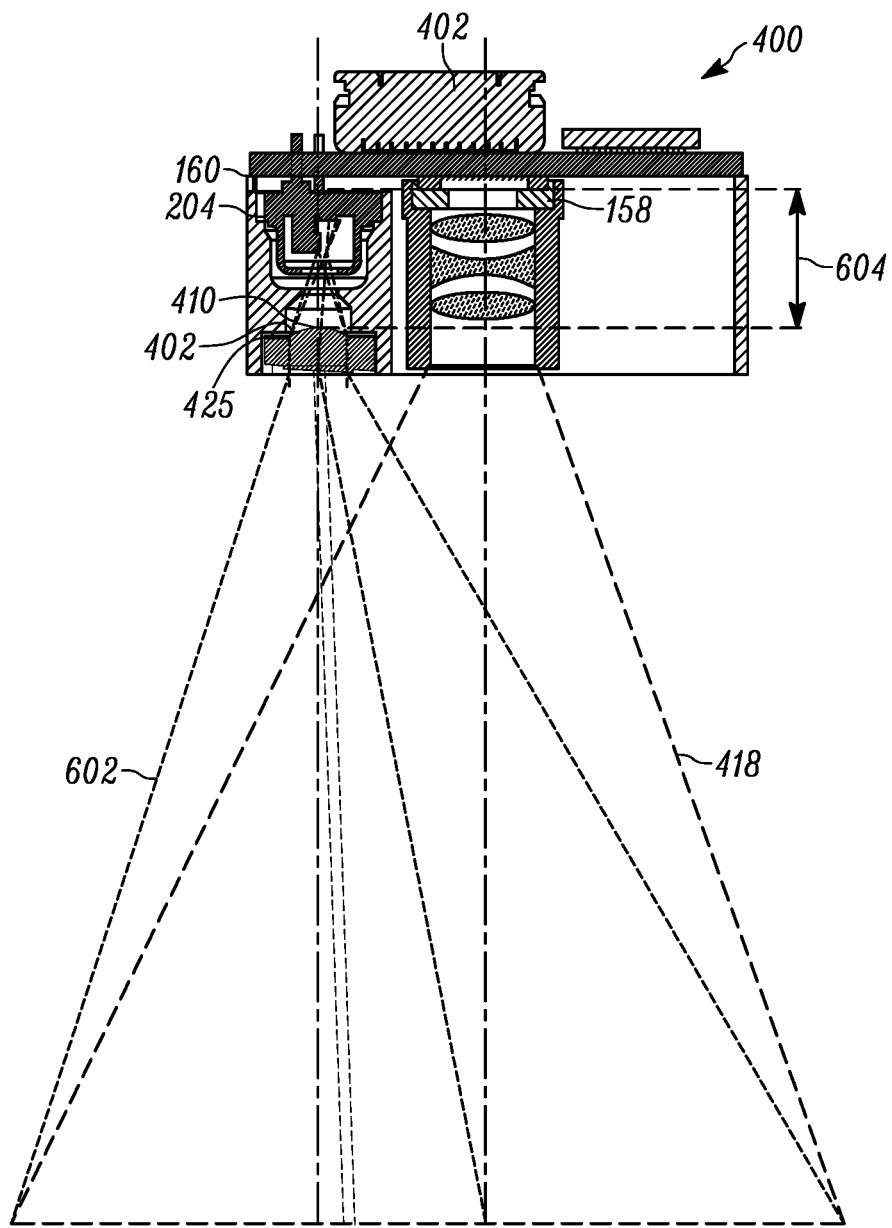
FIG. 6 is a plan view of the imaging arrangement of FIG. 4 illustrating the fields of view of the light source and the imaging assembly.

FIG. 6 illustrates a plan view of the imaging arrangement 400 showing the field of view 418 of the imaging assembly 158 and a field of view 602 of the light source 204, where the field of view 418 of the imaging assembly 158 may be referred to as an imaging field of view and the field of view 602 of the light source 204 may be referred to as an aiming field of view. As shown, the fields of view 418, 602 are each approximately 48° and a distance 604 between the vertex 410 of the first surface 404 and the PCB 160 is approximately 6.9 mm. However, the fields of view 418, 602 may be different from one another and/or may be different than shown. As set forth herein, the phrase "approximately 6.9 mm" means+/−1.0 mm of 6.9 mm and/or account for manufacturing tolerances.

From the foregoing, it will be appreciated that the above disclosed apparatus, methods and articles of manufacture enable imaging arrangements and scanning arrangements to be produced in smaller sizes. Specifically, the examples enable the arrangements to be produced with a width of approximately 9 millimeters or less. Of course, different widths (greater widths, lesser widths) may be achievable using the disclosed examples.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An imaging arrangement for use in a barcode reader, comprising:
a housing;
a light source configured to emit light along a central light axis, the light source being disposed in the housing;
a lens having a first surface and a second surface opposite the first surface, the lens being disposed in the housing, the first surface configured to face the light source and structured to substantially collimate light received from the light source into a collimated beam, the second surface including surface structures structured to generate a patterned beam in response to receiving the collimated beam; and
an aperture, the aperture being disposed between the light source and the lens, the aperture sized to enable a first portion of the light emitted from the light source to pass through the lens and to prevent a second portion of the light emitted from the light source from passing through the lens,
wherein the aperture is disposed adjacent the first surface to enable a portion of the first surface to extend through the aperture toward the light source.

2. The imaging arrangement of claim 1, wherein the light source is at least one of a laser or a light emitting diode.

3. The imaging arrangement of claim 1, wherein the light source is configured to emit an aiming light.

4. The imaging arrangement of claim 1, wherein the portion of the first surface is convex.

5. The imaging arrangement of claim 4, wherein the second surface is substantially planer relative to the portion.

6. The imaging arrangement of claim 1, wherein the aperture is between about 1.0 millimeters and 5.0 millimeters.

7. The imaging arrangement of claim 1, wherein the second surface includes ribs.

8. The imaging arrangement of claim 1, further including a camera disposed in the housing, the camera configured to capture image data associated with the patterned beam.

9. The imaging arrangement of claim 1, wherein the second surface is angled relative to the light source such that light reflected from the second surface toward the light source is directed at an oblique angle relative to the central light axis.

10. The imaging arrangement of claim 1, wherein the patterned beam is to be projected outside of the housing without passing through an additional lens.

11. The imaging arrangement of claim 1, wherein the lens is a single-molded part.

12. The imaging arrangement of claim 1, wherein the first surface is a substantially hyperbolic surface.

13. The imaging arrangement of claim 1, wherein the second surface is a defractive optical element, a refractive optical element, or an engineered diffuser.

14. The imaging arrangement of claim 1, wherein an effective focal length of the lens is less than 5 millimeters.

15. The imaging arrangement of claim 1, wherein a plane that extends along the second surface is disposed at an angle relative to the central light axis such that light reflected from the second surface toward the light source is directed at an oblique angle relative to the central light axis.

16. The imaging arrangement of claim 1, wherein the first surface is a refractive surface, a Fresnel surface, or a diffractive surface.

17. An imaging arrangement for use in a barcode reader, comprising:
a housing including a front wall and a rear wall;
a light source configured to emit light along a central light axis, the light source to be disposed in the housing proximate the rear wall; and
means for collimating the light from the light source into a collimated beam and generating a patterned beam in response to receiving the collimated beam, the means for the collimating of the light and the generating of the patterned beam enables a distance between the front wall and the rear wall to be approximately 9 millimeters or less, wherein the means for the collimating of the light and the generating of the patterned beam is positioned proximate the front wall
wherein the means for the collimating of the light and the generating of the patterned beam includes a lens including a first surface and a second surface opposite the first surface, the lens to be disposed in the housing, the first surface configured to face the light source and structured to substantially collimate light received from the light source into the collimated beam, the second surface including surface structures structured to generate the patterned beam in response to receiving the collimated beam,
wherein the means for the collimating of the light and the generating of the patterned beam further includes an aperture, the aperture being disposed between the light source and the lens, the aperture sized to enable a first portion of the light emitted from the light source to pass through the lens and to prevent a second portion of the light emitted from the light source from passing through the lens, and
wherein a plane that extends along the second surface is disposed at an angle relative to the central light axis such that light reflected from the second surface toward the light source is directed at an oblique angle relative to the central light axis.

18. The imaging arrangement of claim 17, wherein the housing is a rectangular prism.

19. The imaging arrangement of claim 17, wherein the light source is a laser.

20. A barcode reader, comprising:
a housing;
an imaging arrangement disposed in the housing, the imaging arrangement comprising:
a light source configured to emit light;
imaging sensor having a plurality of photosensitive elements and configured to capture image data;
a controller configured to process the image data;
a lens having a first surface and a second surface opposite the first surface, the first surface configured to face the light source and structured to substantially collimate light received from the light source into a collimated beam, the second surface including surface structures structured to generate a patterned beam in response to receiving collimated beam; and
an aperture, the aperture being disposed between the light source and the lens, the aperture sized to enable a first portion of the light emitted from the light source to pass through the lens and to prevent a second portion of the light emitted from the light source from passing through the lens,
wherein the controller is configured to cause the imaging sensor to capture the image data associated with the patterned beam.

21. The barcode reader of claim 20, wherein the first surface is a refractive surface, a Fresnel surface, or a diffractive surface.

22. The barcode reader of claim 20, wherein the second surface is a defractive optical element, a refractive optical element, or an engineered diffuser.

23. The barcode reader of claim 20, wherein an effective focal length of the lens is less than 5 millimeters.

* * * * *